United States Patent [19]

Christiansen et al.

[11] Patent Number: 4,818,479

[45] Date of Patent: Apr. 4, 1989

[54] NUCLEAR REACTOR SPACER GRID AND DUCTLESS CORE COMPONENT

[75] Inventors: David W. Christiansen, Kennewick; Richard A. Karnesky, Richland, both of Wash.

[73] Assignee: The United States of America as represented by the United States Department of Energy, Washington, D.C.

[21] Appl. No.: 784,277

[22] Filed: Oct. 4, 1985

[51] Int. Cl.[4] .............................................. G21C 3/34
[52] U.S. Cl. .................................... 376/442; 376/439; 376/443; 376/438
[58] Field of Search ............... 376/442, 441, 443, 444, 376/352, 438, 439

[56] References Cited

U.S. PATENT DOCUMENTS

| | | |
|---|---|---|
| Re. 28,362 | 3/1975 | Calvin . |
| 3,228,854 | 1/1966 | Bekkering et al. . |
| 3,314,860 | 4/1967 | Wilman . |
| 3,398,053 | 8/1968 | Huber et al. . |
| 3,423,287 | 1/1969 | Anthony et al. . |
| 3,715,275 | 2/1973 | Krawiec . |
| 3,762,996 | 10/1973 | Milburn et al. . |
| 3,764,470 | 10/1973 | Calvin . |
| 3,769,159 | 10/1973 | Zinn et al. . |
| 3,787,285 | 1/1974 | Marstrano . |
| 3,801,088 | 4/1974 | Piepers et al. . |
| 3,833,471 | 9/1974 | Chetter .................................. 376/442 |
| 3,844,887 | 10/1974 | Georges et al. . |
| 3,886,038 | 5/1975 | Raven . |
| 3,920,515 | 11/1975 | Ferrari et al. ........................ 376/442 |
| 3,929,569 | 12/1975 | Piepers et al. . |
| 3,933,584 | 1/1976 | Litt . |
| 3,954,560 | 5/1976 | Delafosse et al. .................... 376/442 |
| 4,007,899 | 2/1977 | Piepers et al. . |
| 4,058,436 | 11/1977 | Anthony . |
| 4,059,483 | 11/1977 | Anthony . |
| 4,160,477 | 7/1979 | Roffler . |
| 4,224,107 | 9/1980 | Delafosse et al. . |
| 4,285,771 | 8/1981 | Downs . |
| 4,313,797 | 2/1982 | Attix . |
| 4,396,573 | 8/1983 | Feutrel ................................. 376/442 |
| 4,426,355 | 1/1984 | Burger . |
| 4,594,216 | 6/1986 | Feutrel ................................. 376/442 |
| 4,654,194 | 3/1987 | Christiansen et al. .............. 376/443 |

OTHER PUBLICATIONS

A. J. Court, M. F. Edgar, and D. J. Racki, "Refueling Handling Test of a Ductless Breeder Core", Transactions of the American Nuclear Society, vol. 38, pp. 512-514, Jun. 1981.

Primary Examiner—John F. Terapane
Assistant Examiner—John S. Maples
Attorney, Agent, or Firm—Robert Southworth, III; Judson R. Hightower

[57] ABSTRACT

The invention relates to a nuclear reactor spacer grid member for use in a liquid cooled nuclear reactor and to a ductless core component employing a plurality of these spacer grid members. The spacer grid member is of the egg-shell type and is constructed so that the walls of the cell members of the grid member are formed of a single thickness of metal to avoid tolerance problems. Within each cell member is a hydraulic spring which laterally constrains the nuclear material bearing rod which passes through each cell member against a hardstop in response to coolant flow through the cell member. This hydraulic spring is also suitable for use in a water cooled nuclear reactor. A core component constructed of, among other components, a plurality of these spacer grid members, avoids the use of a full length duct by providing spacer sleeves about the sodium tubes passing through the spacer grid members at locations between the grid members, thereby maintaining a predetermined space between adjacent grid members.

6 Claims, 11 Drawing Sheets

NUCLEAR REACTOR SPACER GRID AND DUCTLESS CORE COMPONENT

GOVERNMENT CONTRACT

This invention was made or conceived in the course of or under a contract with the United States Department of Energy.

BACKGROUND OF THE INVENTION

This invention relates to liquid metal cooled fast flux nuclear reactor core assemblies and, more particularly, to a nuclear reactor spacer grid formed by the interconnection of grid strips and having a hydraulic spring and to a ductless core component employing this spacer grid.

Cores designed for use in liquid metal cooled fast nuclear reactors typically include closely packed hexagonal fuel assemblies whereby the core approaches the configuration of a right circular cylinder. Typical fuel assemblies include a plurality of fuel rods of circular cross section bundled in a triangular array within a full length thin wall duct. The fuel rods are supported at one end, allowing free axial expansion, and laterally supported along their lengths by wire wraps about the rods and/or by egg-crate type grid structures positioned at selected locations along the assembly length within the duct. Such full-length ducted assemblies limit coolant cross flow among adjacent fuel assemblies, increase the amount of metal in the core, thereby lessening nuclear efficiency, and increase the pressure drop through the core which further decreases efficiency. These adverse characteristics can be avoided by use of open-lattice fuel assemblies which eliminate the full length duct in favor of positioning grid structures at selected axial positions, as well known in the generally square fuel assemblies of light water reactors having fuel rods positioned in a square array.

One form of ductless fuel assembly is described in U.S. Pat. No. 4,285,771 issued to Robert E. Downs on Aug. 25, 1981 and assigned to Westinghouse Electric Corporation. The fuel assembly described therein includes coextending fuel rods of circular cross section arranged in a triangular rod array with the bundle of rods approaching the configuration of a regular hexagon. At each corner, one or more rods is removed and there is located a strong back, generally coextensive with the fuel rods, which is the axial support for the assembly. The outer periphery of the strong back is also the area of contact among adjacent assemblies. While the strong back structures collectively contain less metal than the thin walled duct which they replace, the amount of metal in the strong backs remain significant. Also each strong back occupies a position which could be occupied by one or more rods containing nuclear material.

The egg-crate type grid structures currently employed for laterally supporting rods containing nuclear material within a nuclear core assembly for a liquid metal cooled reactor are formed by the interconnection of grid strip members. However, the method currently used to interconnect the grid strip members to form a spacer grid having cell members therewithin results in approximately half of the walls of each cell member being formed by portions of two grid strip members. The variations in thickness of the grid strip members must be within a certain tolerance. In the walls of the cell members which are made of portions of two grid strip members, the combined variations in grid strip thickness of the two grid strip member portions which make up the walls must be within the same tolerance as the portion of the grid strip members forming single thickness walls. What is needed is a method of manufacturing a grid structure which will overcome this tolerance problem and provide a laterally strong grid structure which does not overly restrict flow of coolant through the core component.

Within each cell member formed by the interconnection of grid strip members in the grid structure, a nuclear material containing rod must be laterally supported. This lateral support generally takes the form of hardstop members disposed on two of the walls of the cell member and a spring member disposed on the third wall forcing the rod against the hardstop members. The force of the spring is derived from bending of the metal. During operation of the nuclear reactor, exposure to radiation and high temperatures can result in spring relaxation. This lessening of the biasing force of the spring can permit vibration of the rod within the cell member, causing damage to the rod. What is needed is a spring for providing lateral support for a rod in a nuclear reactor spacer grid which does not have a lessening bias force after continual exposure to radiation and high temperatures.

It is thus desirable to provide an open lattice core component for a liquid cooled, fast neutron flux reactor so as to achieve, among other advantages, coolant cross flow among core components. It is further desirable to provide a grid structure for use in this core component which provides sufficient lateral constraint for the nuclear material containing rods, does not overly restrict coolant flow through the core component, and which has cell member walls formed from a portion of only one grid strip member to avoid tolerance problems. It is also desirable to provide within each cell member of this grid structure a spring for laterally constraining the nuclear material containing rod which is not subject to spring relaxation by prolonged exposure to radiation and high temperatures.

SUMMARY OF THE INVENTION

This invention provides a ductless core component for use in a liquid cooled, fast neutron flux reactor core for axially and laterally constraining a plurality of rods containing nuclear material comprising an upper support plate member, an upper spacer grid member, a plurality of intermediate spacer grid members, a lower spacer grid member, a lower support plate member, a nozzle rigidly engaged to the lower support plate member, a plurality of orifice plates disposed between the lower support plate member and the nozzle, a plurality of support rods passing through the intermediate spacer grid members and fixedly attached to the upper support plate member and the lower support plate member, the support rods being provided with passage axially therethrough for passing a flow of liquid coolant, and a plurality of spacer sleeves disposed about each of the support rods between the upper spacer grid member and the uppermost of the intermediate spacer grid members, between each of the intermediate spacer grid members and the intermediate spacer grid member immediately beneath it, and between the lowermost of the intermediate spacer grid members and the lower spacer grid member for maintaining a predetermined spacing between the grid members between which the spacer sleeves are disposed.

The invention further provides in combination with a nuclear reactor spacer grid for use in a nuclear reactor core assembly to laterally constrain elongated rods containing nuclear material passing through the spacer grid, which nuclear reactor spacer grid includes grid strip members, rigid cell members formed by the interconnection of the grid strip members and having central passages for passing axially therethrough the elongated rods and for directing therethrough a flow of coolant, which is provided by a reactor coolant pump, in a generally axially upward direction and into contact with the elongated rods, hardstop means disposed in the cell members on two of the grid strip members forming the cell members proximate the elongated pin, and spring means disposed within the cell member on the balance of the grid strip members forming the cell members and having a face in contact with the elongated rod, the improvement wherein the spring means is provided with an aperture proximate the bottom of the spring means opening into channel means between the spring means and the grid strip member upon which the spring means is disposed for directing a portion of the coolant flow passing upwardly through the cell members to flow through the aperture means and the channel means and into contact with the spring means opposite the face in contact with the rod to provide the spring means with a lateral hydraulic biasing force for continually urging the elongated rod against the hardstop means, the strength of the hydraulic biasing force being dependent on the rate of flow of coolant through the reactor core assembly.

The invention also provides a nuclear reactor spacer grid for use in a nuclear reactor core assembly to laterally constrain elongated rods containing nuclear material, which nuclear reactor spacer grid comprises a plurality of top grid strip members provided with first slot means along the bottom edges thereof, a plurality of middle grid strip members provided with second slot means along the top edges for engaging the first slot means of the top grid strip members when the top grid strip members and the middle grid strip members are interconnected, the middle grid strip members are further provided with third slot means along the bottom edges thereof, a plurality of bottom grid strip members provided with fourth slot means along the top edges for engaging the third slot means when the middle grid strip members and the bottom grid strip members are interconnected, the interconnection of the top grid strip members, the middle grid strip members, and the bottom grid strip members, forming a plurality of cell members with each elongated pin passing through and being laterally constrained with one of the cell members, and an outer grid strip member extending about the periphery of the spacer grid and engaging the lateral edges of the top grid strip members, the middle grid strip members, and the bottom grid strip members.

DESCRIPTION OF THE PREFERRED EMBODIMENTS

Figure 1:
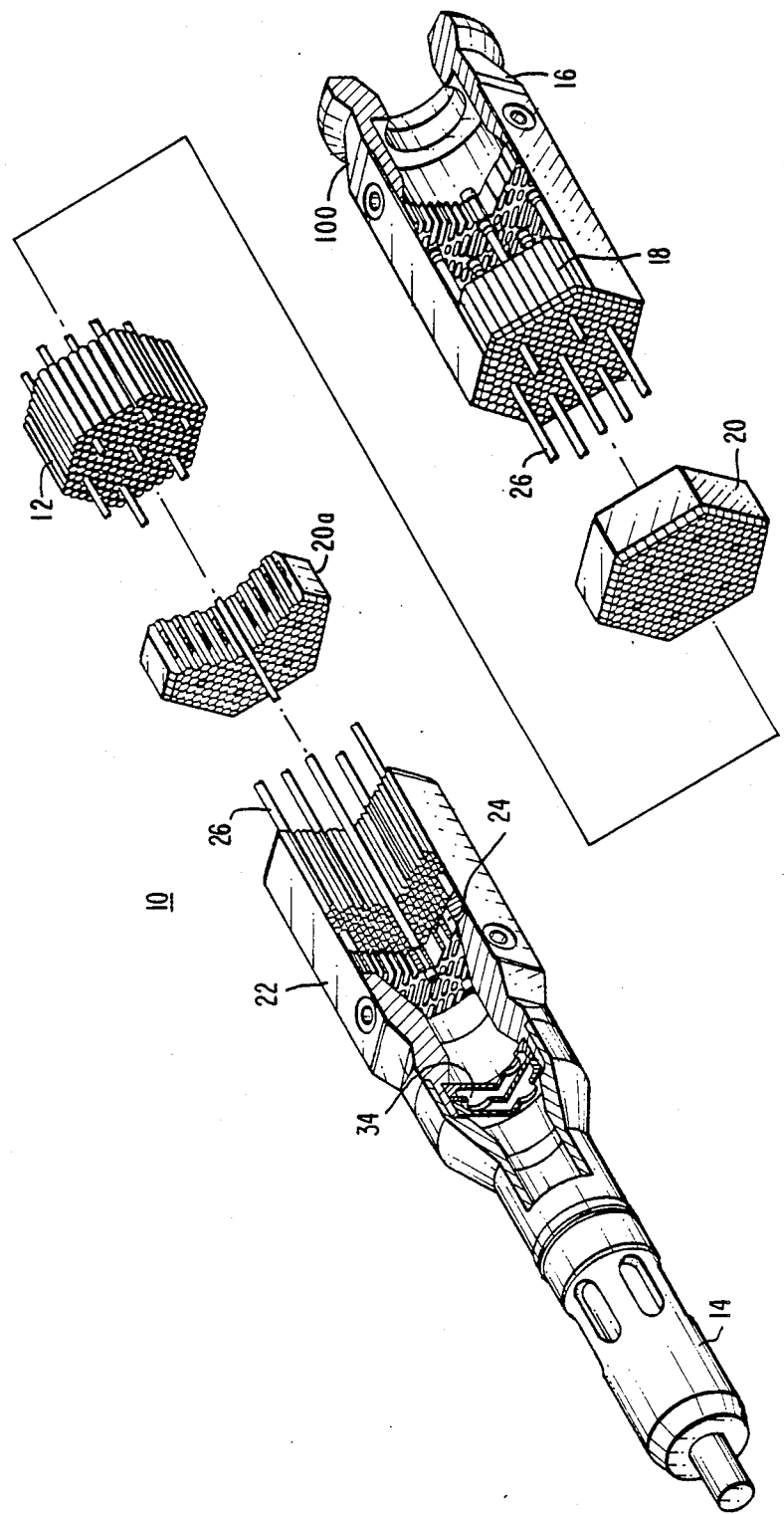
FIG. 1 is an exploded isometric view with parts cut away of the ductless core component and spacer grids of the invention.

Referring now to FIG. 1 there is shown a ductless core component 10 for use in a liquid cooled fast flux nuclear reactor in accordance with the invention, preferably a reactor cooled by a liquid metal such as sodium. The component 10 includes a plurality of coextending, parallel rods 12 each having therein nuclear material, such as fuel pellets, bundled together in a generally hexagonal open-lattice configuration. The term "open-lattice" refers to the absence of a duct structure laterally encasing the full length of the bundled rods. The rods are supported at one end, such as by an inlet nozzle 14, and are free to expand axially upward. The core component is further made up of an upper support plate 16, an upper grid member 18, a plurality of intermediate grid members, only two of which, 20 and 20a, are shown for simplicity, a lower grid member 22, and a lower support plate 24. Rods 12 are supported at one end by lower support plate 24 and extend axially upward through lower grid member 22, intermediate grid members 20 and 20a, upper grid member 18 and upper support plate 16. As is well known in the art, the lower grid member 22, intermediate grid members 20 and 20a and upper grid member 18 allow axial expansion while maintaining lateral support for the rods.

Core component 10 derives its axial and lateral strength from sodium tubes 26 which are attached to lower support plate 24 by nuts 28 which thread onto the portion of the sodium tube 26 extending through lower cell support plate 24. Sodium tubes 26 pass through lower grid member 22, intermediate grid members 20 and 20a, upper grid member 18, and are attached to upper support plate 16 by nuts 30. Spacer sleeves 32 are provided about each sodium rod between lower grid member 22 and the lowermost intermediate grid member 20a to space this intermediate grid member 20a from lower grid member 22. Spacer sleeves 32 are also provided around each sodium rod between each of the other intermediate grid members, not all of which are shown, and also between the uppermost grid member 20 and upper grid member 18 to maintain a predetermined distance between adjacent grid members. Each spacer sleeve is provided with a bow of a predetermined magnitude before it is slip fit about a sodium tube 26 in order to provide a snug fit of the spacer sleeve 32 about sodium tubes 26 so that flow induced vibration does not cause wear on sodium tubes 26.

The ductless core component is also provided with orifice plates 34 which are used to regulate the flow of coolant through individual core components. In this manner, ductless and ducted core components can be used in the same reactor core with the flow of coolant through each being independently adjustable to complement that of the others. The ductless core component is further provided with a flow dispersion tube 35 fluidly and mechanically connecting the nozzle 14 to the lower support plate 24.

Figure 3:
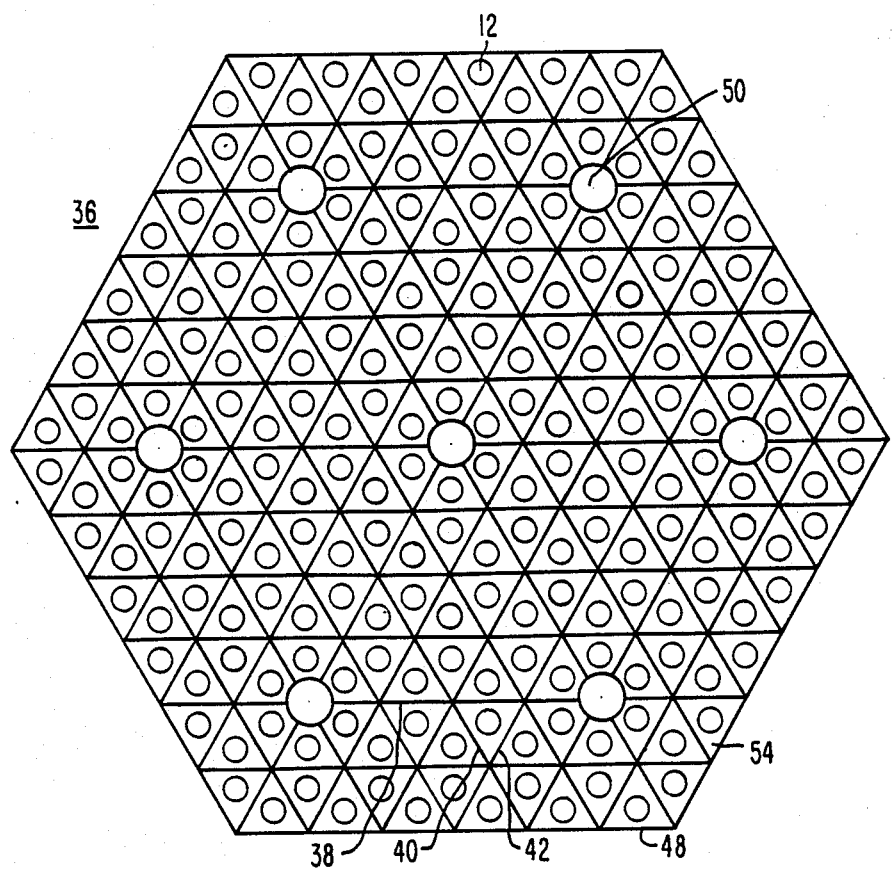
FIG. 3 is a plan view of the spacer grid structure according to the invention.
Figure 7A:
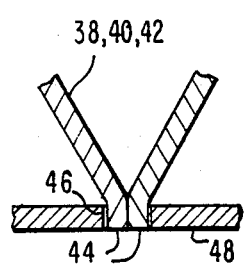
FIG. 7A is a fragmentary sectional plan view of the joint of FIG. 5 taken along the lines VII—VII in that figure.
Figure 7B:
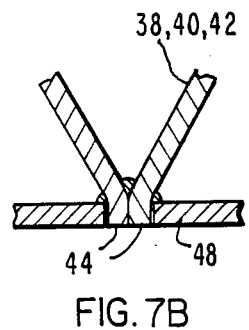
FIG. 7B is a fragmentary sectional plan view of the joint of FIG. 5 after welding taken along the lines VII—VII.
Figure 7C:
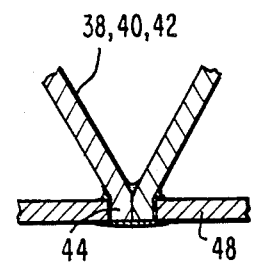
FIG. 7C is a fragmentary sectional plan view of the joint of FIG. 5 after brazing taken along the lines VII—VII.
Figure 4:
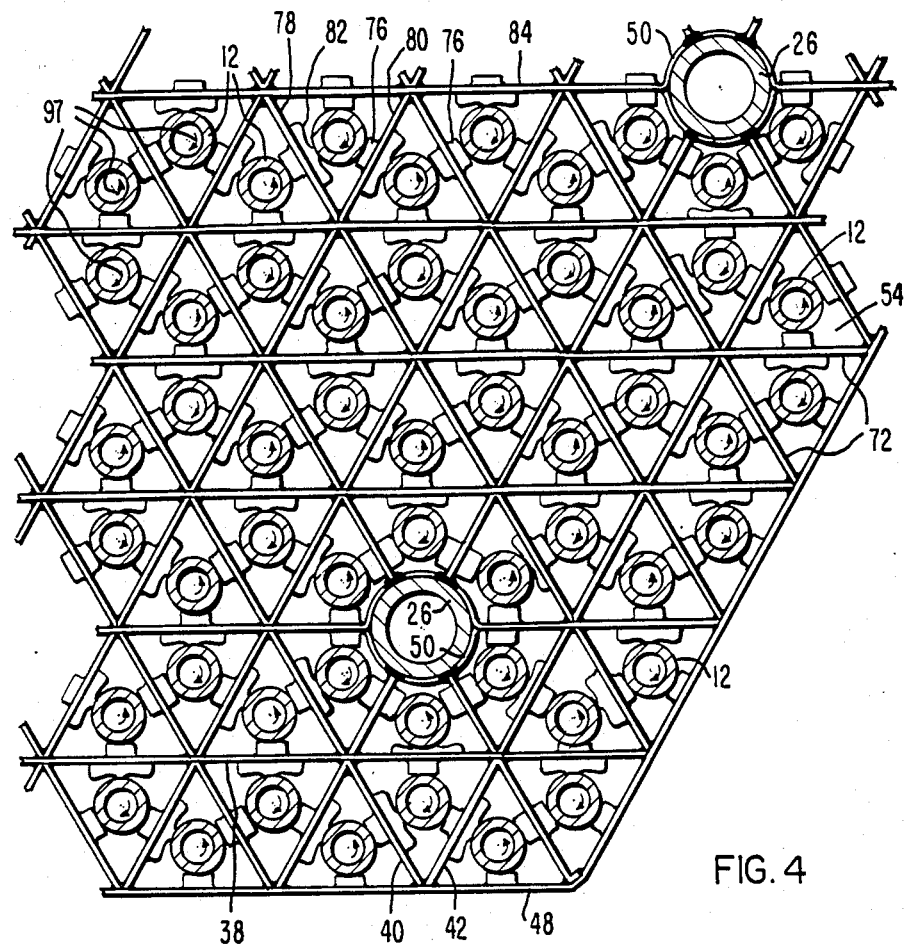
FIG. 4 is a fragmentary enlarged plan view of a portion the spacer grid structure of the present invention illustrating the triangular cell members and the hardstop and spring configuration.

FIG. 3 depicts a preferred embodiment of the nuclear reactor spacer grid 36 manufactured in accordance with the invention. FIG. 4 is an enlargement of one portion of FIG. 3. A grid structure 36 is formed by the interconnection of top grid strip members 38, middle grid strip members 40, and bottom grid strip members 42 as depicted in FIGS. 5, 6, 7A, 7B, and 7C. Tabs 44 along the outer edge of top grid strip member 38, middle grid strip member 40 and bottom grid strip member 42 are engaged by apertures 46 in outer grid strip members 48, which extend around the periphery of the grid structure 36. The resulting joint can be secured by welding or by brazing as depicted in FIGS. 7B and 7C respectively.

Figure 8:
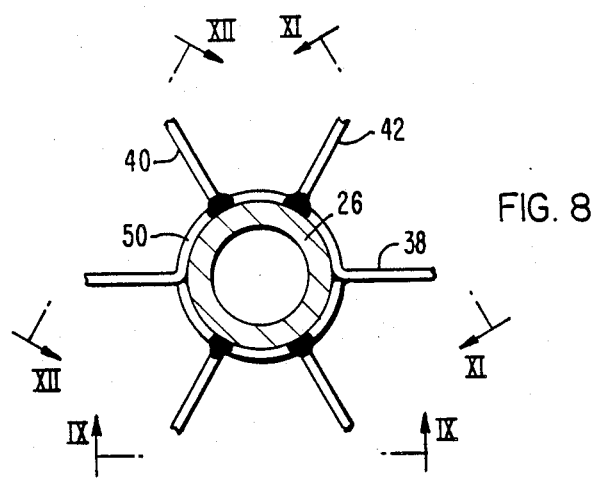
FIG. 8 is a fragmentary plan view of a grid tube interconnection within the grid structure.
Figures 5, 6:
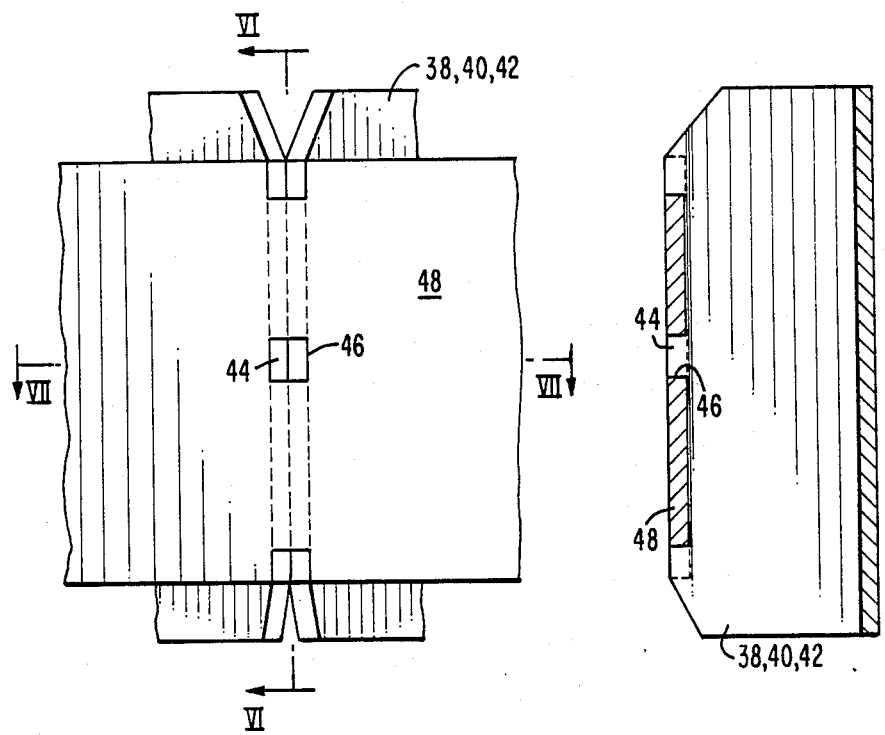
FIG. 5 depicts in fragmentary elevation the joint formed at the intersections of the top, middle, and bottom grid strip members with the outer grid strip member.
FIG. 6 is a fragmentary sectional elevation taken along the lines VI—VI in FIG. 5.
Figure 11:
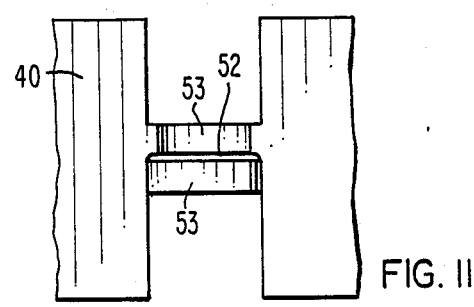
FIG. 11 is a fragmentary sectional elevation taken along the lines XI—XI in FIG. 8.
Figure 12:
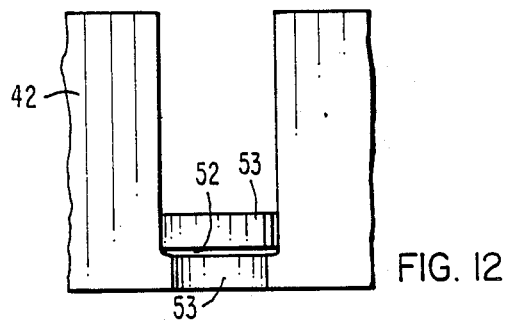
FIG. 12 is a fragmentary sectional elevation taken along the lines XII—XII in FIG. 8.

Grid structure 36 is further provided with formed grid tube members 50 which accommodate sodium tubes 26 which extend through the grid structures 36. FIGS. 8, 9, 10, 11, and 12 depict the preferred manner in which grid tubes 50 are formed and attached to top grid strip members 38, middle grid strip members 40, and bottom grid strip members 42. As observable in FIGS. 9 and 10, a grid tube strap slot 52 is stamped in top grid strip member 38 at a first elevation between grid tube straps 53. As shown in FIGS. 11 and 12 respectively, a grid tube strap slot 52 is stamped in middle grid strip member 40 at a second elevation and a grid tube strap slot 52 is stamped in bottom grid strip member 42 at a third elevation to aid in forming grid tube straps 53. A grid tube 50 is then formed by the interconnection of top grid strap member 38, middle grid strip member 40, and bottom grid strip member 42 and comprises the six grid tube straps 53 previously described. Grid strip members 38, 40, and 42 are then welded and/or brazed at their interconnection as depicted in FIG. 8. Final structural grid tube 50 interlocking for grid strip members 38, 40 and 42 is achieved when sodium tubes 26 are extended through grid tubes 50 of grid structure 36.

Figure 13:
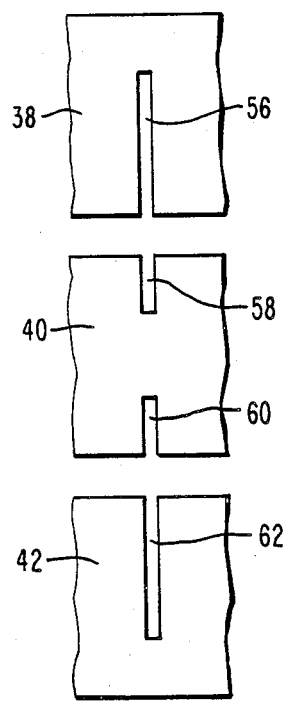
FIG. 13 is a fragmentary elevational view of the mechanism for interconnecting the top, middle, and bottom grid strip members.
Figure 9:
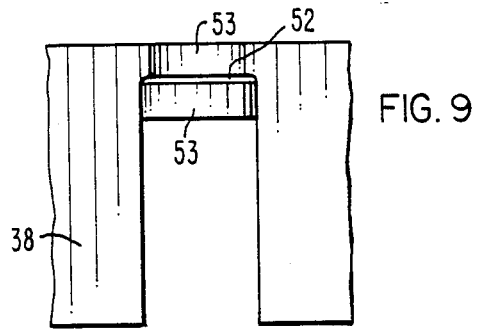
FIG. 9 is a fragmentary sectional elevation taken along the line IX—IX in FIG. 8.
Figure 10:
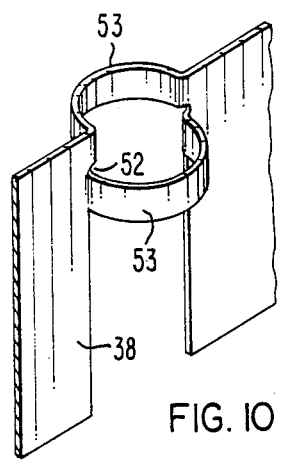
FIG. 10 is an isometric view of the grid tube straps formed on the top grid strip member.
Figure 14A:
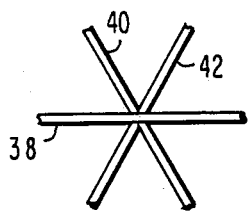
FIG. 14A is a fragmentary plan view of the joint formed by interconnecting the top, middle and bottom grid strip members.
Figure 14B:
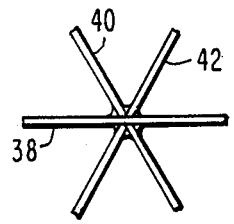
FIG. 14B is a fragmentary plan view of the joint of FIG. 14A after welding.
Figure 14C:
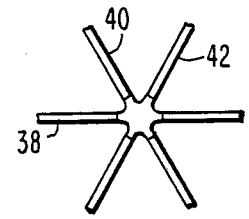
FIG. 14C is a fragmentary plan view of the joint of FIG. 14A after brazing.

FIGS. 13 and 14 depict the method of interconnecting top grid strip member 38, middle grid strip member 40 and bottom grid strip member 42 to form the cell members 54 depicted in FIG. 4. Top grid strip member 38 is provided with inverted single slots 56 along its bottom surface. Middle grid strip member 40 is double slotted, with slots 58 along its upper surface and inverted slots 60 along its bottom surface. Bottom grid strip member 42 is provided with slots 62 only along its upper surface. Slot 56 of top grid strip member 38 slidingly engages slot 58 along the top surface of middle grid strip member 40. Slot 60 in the lower edge of middle grid strip 40 slidably engages slot 62 along the upper edge of bottom grid strip member 42. The resulting intersection of the four slots is as depicted in FIG. 14A. The joint is then made permanent by welding or brazing as depicted in FIGS. 14B and 14C respectively.

Figure 15:
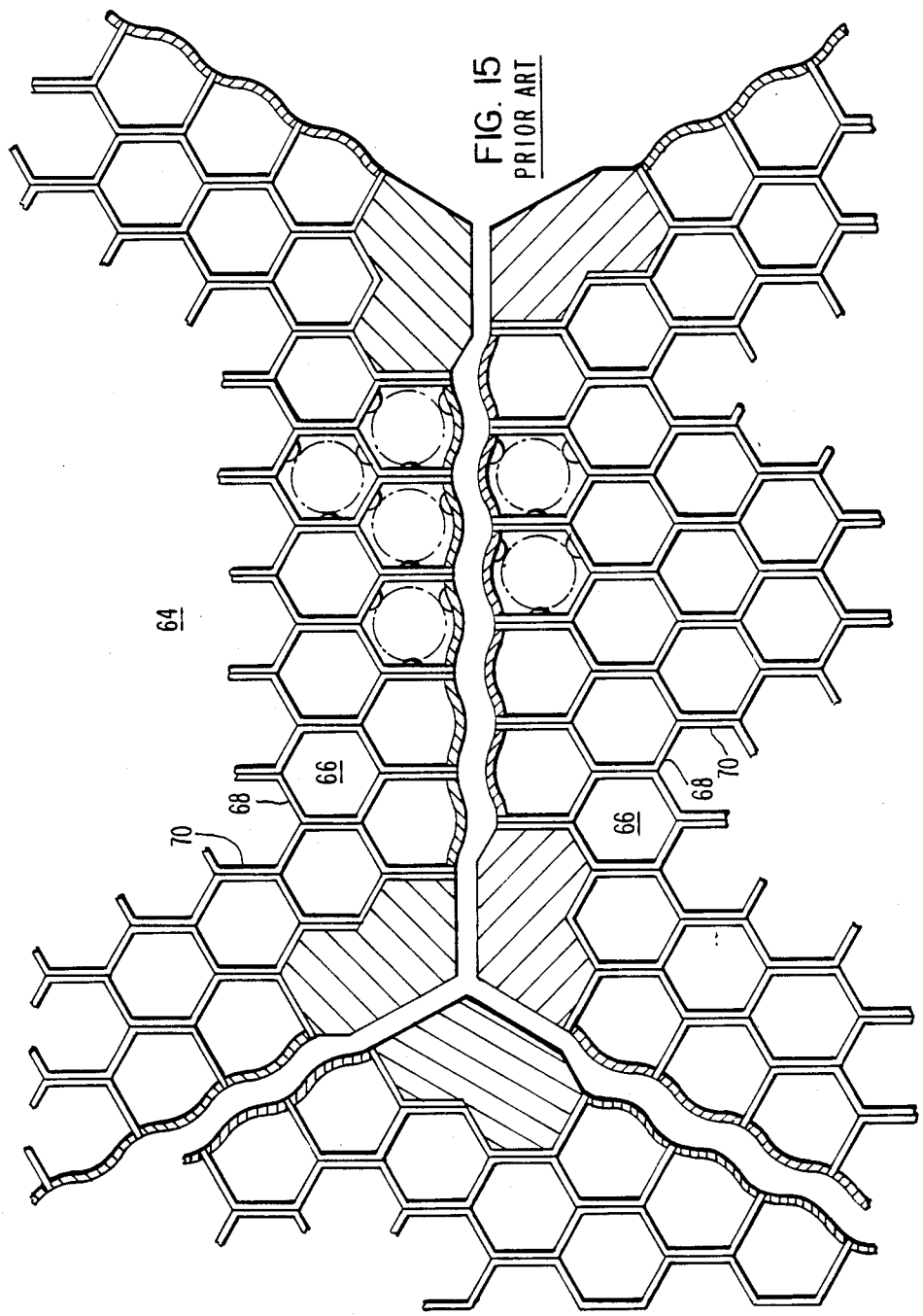
FIG. 15 is a fragmentary plan view of a prior art spacer grid structure with hexagonal cell members.

FIG. 15 depicts a prior art nuclear grid structure 64 for use in a liquid cooled, fast flux nuclear reactor. It is readily observable that the cell members 66 are generally hexagonal. Closer scrutiny of FIG. 15 reveals that half of the wall members 68 are formed from a portion of a single grid strip member while the other half 70 are formed from portions of two grid strip members. Since each wall member must be formed to the same tolerance, the double metal thickness of wall members 70 increases the difficulty in achieving this tolerance level by a factor of two. As seen in FIG. 4, all of the wall members 72 of cell members 54 are formed of a single thickness of metal from a portion of a single grid strip member.

Referring to FIG. 4, nuclear material containing rods 12 extend through each of cell members 54 and must be laterally constrained therein. Towards this end, hardstop means such as hardstop members 76 are provided along two of the wall members 78 and 80 which comprise cell member 54. A spring means, such as spring member 82, is provided along the third wall member 84 which makes up cell member 54. Spring member 82 engages rod 12 and forces it firmly against hardstop members 76 to prevent damage caused by flow induced vibration.

Figure 16A:
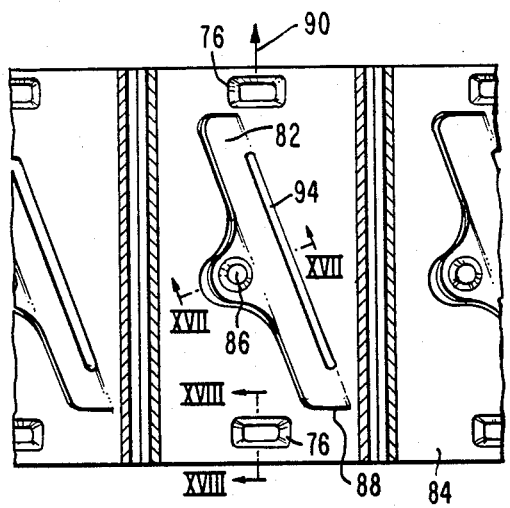
FIG. 16A is a fragmentary elevational view of the spring member and the hardstop members of the grid structure.
Figure 16B:
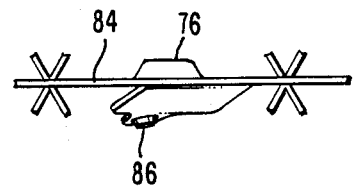
FIG. 16B is a fragmentary plan view of the spring member and hardstop members of the invention.
Figure 17:
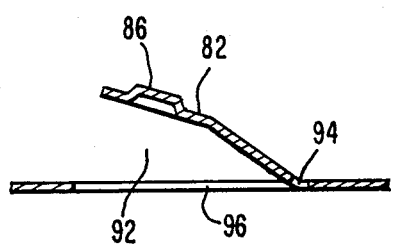
FIG. 17 is a fragmentary sectional plan view of the spring member taken along the lines XVII—XVII of FIG. 16A.

A novel spring structure for use in this grid structure is illustrated in FIGS. 16A, 16B, and 17. Dimple 86 contacts the rod. Spring member 82 is provided with an aperture 88 at its bottom edge. This aperture 88 enables coolant flowing in the direction of arrow 90 to enter a channel means such as channel 92 formed on the side of the spring member 82 opposite dimple 86 as observable in FIG. 17. The force with which spring member 82 pushes against the rod is dependent upon the rate of flow of coolant through channel 92, which flow forces spring member 82 and dimple 86 against the rod. The rate of flow of coolant through channel 92 is directly related to the rate of flow of coolant through the reactor and the fuel assemblies therein. Slot 94 provided in spring member 82 serves to create a predetermined spring force in spring member 82 based on a predetermined rate of coolant flow through the core component. Spring member 82 may be formed integral with grid strip member 84 or may be attached thereto by welding or otherwise. In either case, an aperture 96 is provided in grid strip member 84 on the side of spring member 82 opposite dimple 86 and proximate channel 92.

The angle of inclination of spring member 82 with respect to the generally axial coolant flow also serves to regulate the spring force with which spring member 82 contacts rod 12. As depicted in FIG. 16A, the preferred angle of inclination with respect to the axis of the core component, which generally corresponds to the direction of coolant flow through the core component, is 9 degrees. This inclination of spring member 82 serves to further enhance mixing of the coolant by directing a portion of the coolant flow traveling in channel 92 through aperture 96 and into the adjacent cell member 30 and by directing the balance of coolant flow traveling in channel 92 into flow with a radial component. As illustrated by arrows 97 in FIG. 4, preferred fuel assembly coolant mixing characteristics can be achieved by establishing a preferred orientation of spring members 82 in cell members 54. While the above description is of a spring for use in a liquid metal cooled nuclear reactor, this hydraulic spring is also suitable for use in a water cooled nuclear reactor.

Figure 18:
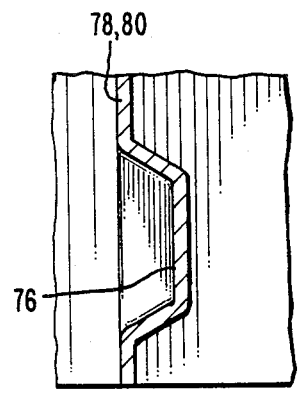
FIG. 18 is a fragmentary sectional elevation of a hardstop member taken along the lines XVIII—XVIII of FIG. 16A.

FIG. 18, which is a cross section through a hardstop member 76 on wall member 84, serves to illustrate a preferred method of manufacturing the hardstop members 76. Hardstop members 76 are preferably formed integrally with grid strip members 78 and 80 by stamping. Hardstop members 76 may alternatively be welded onto the grid strip members. FIGS. 4, 16A, 16B and 17 reveal that while wall member 84 contains the spring member 82 for one cell member 54, it also bears the hardstop member 76 for the adjacent cell member.

Figure 2:
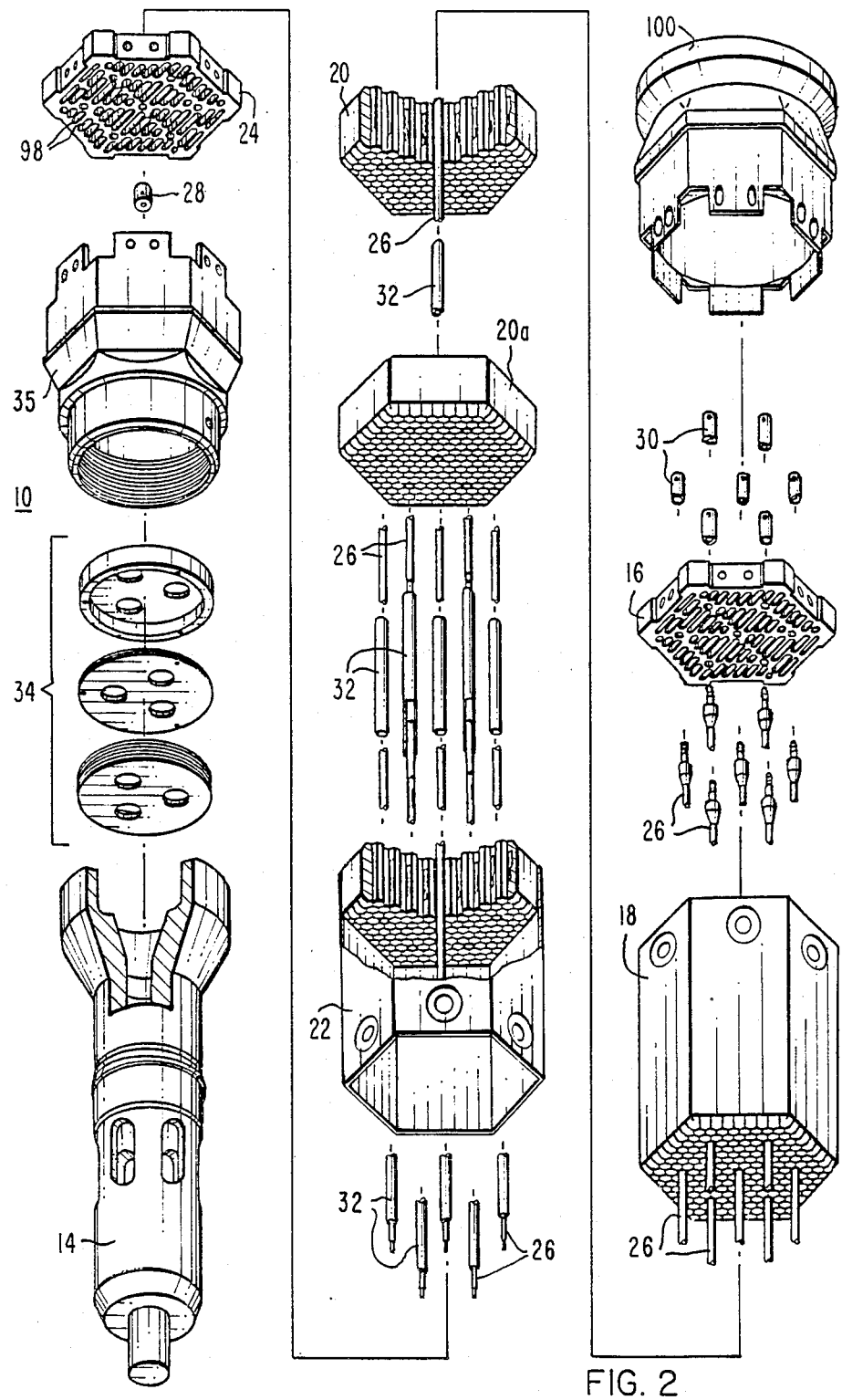
FIG. 2 is an exploded isometric view with parts cut away of the detail construction of the ductless core component of the present invention.

In operation rods 12 may contain fuel, blanket, or absorber material. The core components formed with fuel, blanket, and absorber rods are identical in mechanical construction and are mechanically interchangeable in any core fuel assembly location. Each core component is designed to maintain its structural integrity during reactor heat up, cool down, shutdown, and power operation including the most adverse operation conditions expected through its lifetime during operation of the reactor. Reference to FIGS. 1 and 2, liquid coolant, preferably sodium, is pumped by a reactor coolant pump (not shown) into the bottom of the nozzle 14 and flows upwardly through orifice plates 34 to lower support plate 24. At lower support plate 24, a portion of the coolant flow is directed upwardly through sodium tubes 26, which are opened throughout their lengths, while the balance of coolant flow is directed through sodium flow holes 98 in lower support plate 24 then through cell members 54 in lower grid member 22 and into contact with the exterior of rods 12. While most of the coolant flow continues on through the core component via the intermediate spacer grid members 20a, 20, and the others not shown, then through upper spacer grid member 18 and to upper support plate 16, a portion of the coolant flow is directed into adjacent core components (not shown). Within lower grid member 22, intermediate spacer grid members 20a and 20, and upper spacer grid member 18, the coolant flows through each cell member 54 as depicted in FIG. 4, passing in close proximity to rods 12. Also a portion of the coolant flow is directed through aperture 88 into channel 92. Within channel 92, the coolant flow pushes against the back of inclined spring member 82 and forces dimple 86 into contact with rod 12, forcing rod 12 against hardstop members 76. This continuous spring force derived from coolant flow prevents damage to rods 12 by flow induced vibration. While a portion of the coolant flowing through channel 92 is directed into the adjacent cell member 54 through aperture 96 to promote intermixing and thermal balance, the remainder of the coolant flowing in channel 92 is directed with a radial component out of channel 92. For a given coolant flow velocity, the spring force is regulated by the angle of inclination of spring member 82 with respect to the direction of coolant flow as indicated by arrow 90 as well as by a slot 94 provided in spring member 82. The force with which spring member 82 holds rod 12 against hardstop members 76 is not affected by prolonged exposure to radiation and high temperatures, as is the force of a spring which depends upon material resilience entirely for its spring force. Coolant flowing through sodium tubes 26 and through the core assembly about rods 12 continues upwardly through upper support plate 16 and out of the core component through handling socket 100 (see FIG. 1).

In the unusual event of a severe accident, the sodium tubes 26 provide a passage through the core. Cooling through the core by pumping of the coolant through the sodium tubes can be maintained at all times, which serves to keep down the temperature of the core. Alternatively, the sodium tubes 26 can be blocked at each end and filled with fuel, blanket material, or absorber material to increase the packing density of the core component.

Figure 19:
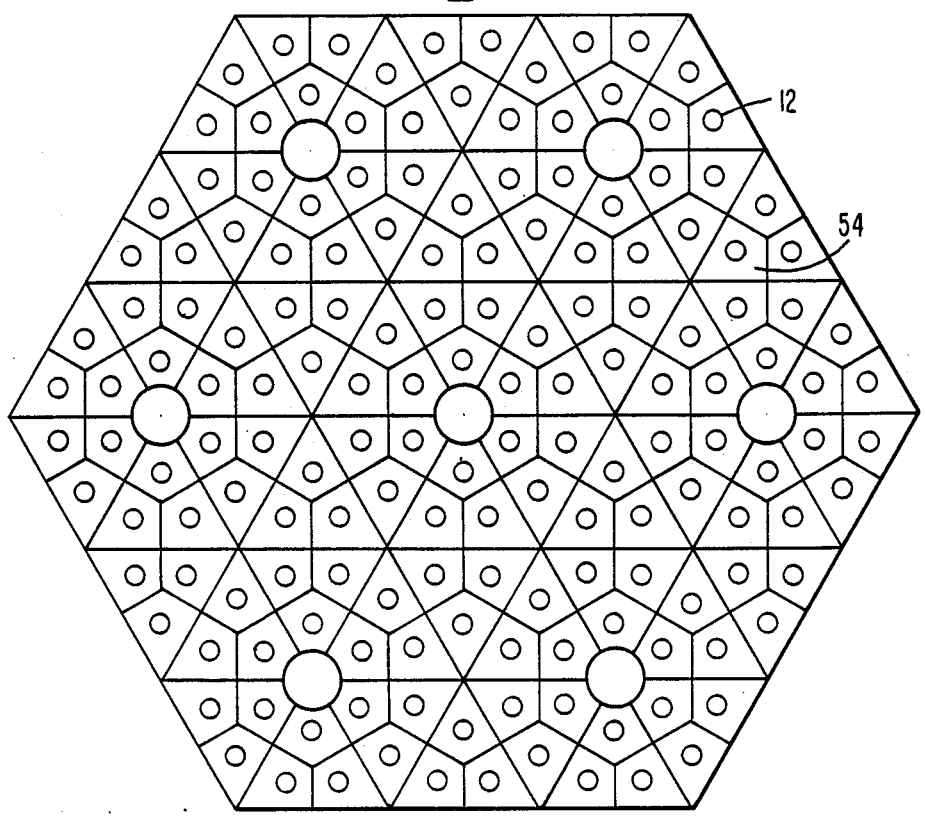
FIG. 19 is a plan view of an alternative embodiment of the grid structure of the invention.
Figure 22:
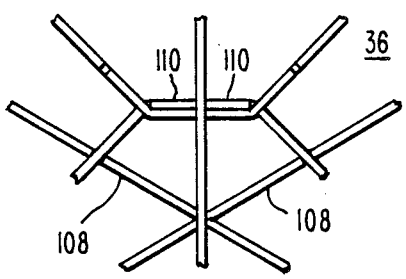
FIG. 22 is a fragmentary plan view of the joint formed by interconnecting the grid strip members of FIG. 21.
Figure 20:
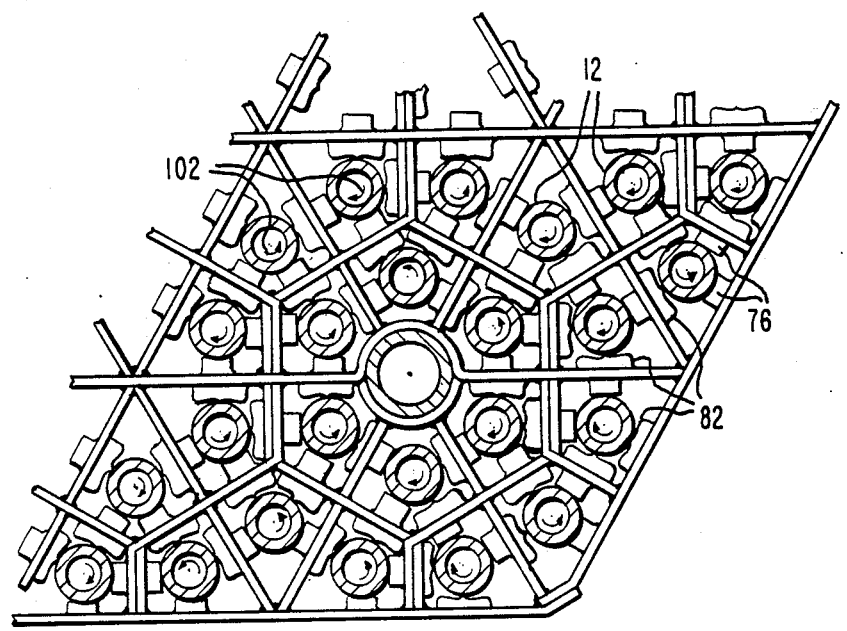
FIG. 20 is an enlarged fragmentary plan view of the alternative grid structure of FIG. 19.
Figure 21:
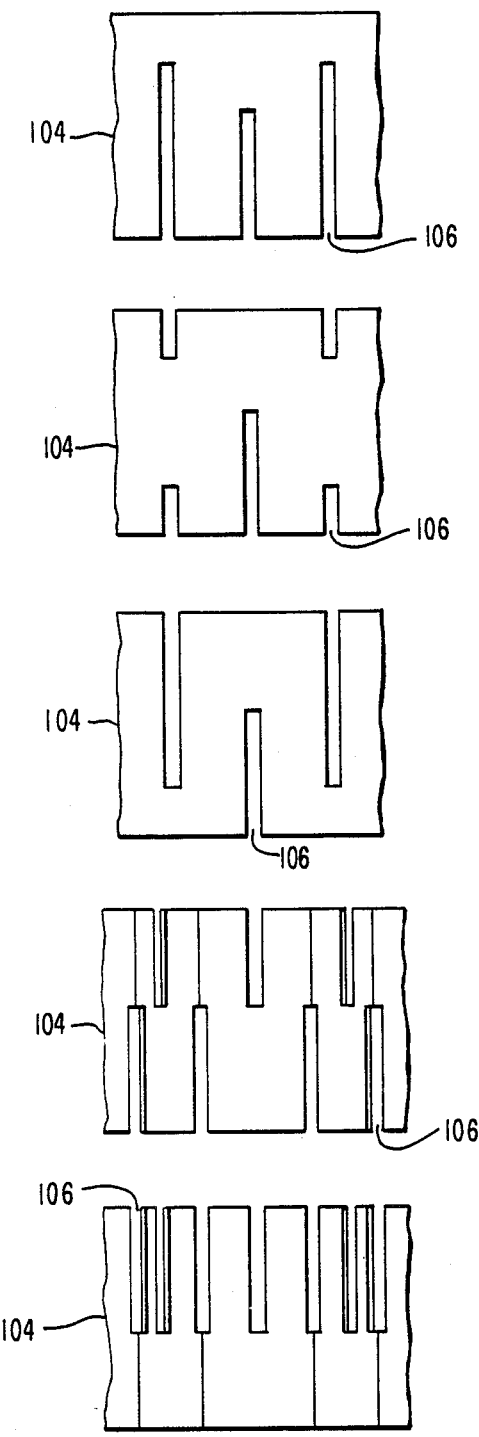
FIG. 21 is a fragmentary elevational view of the mechanism for interconnecting the grid strip members of the alternative grid structure of FIG. 19.

Many variations of the hereinbefore described grid fabrication process are contemplated for design versatility. One alternative embodiment of grid structure 36 is illustrated in FIGS. 19 and 20. This grid structure 36 is an egg-crate type hex grid latticed into a single rod/cell grid. Various packing density effects can be achieved by, for example, forming triple rod/cell grid sections, providing rods at locations other than central to cell members, and installing honeycomb grids internal to a single rod/cell grid, thereby changing the packing density and improving the honeycomb grid strength. As observable in FIG. 20, the alternative embodiment presented utilizes two hydraulic spring members 82 and two hardstop members 76 to constrain each rod 12. Arrows 102 in FIG. 20 illustrate preferred coolant mixing patterns obtained by proper orientation of spring members 82. FIG. 21 depicts the method of interconnecting grid strip members 104, each of which is provided with a plurality of slot members 106 facilitating assembly, and FIG. 22 depicts a portion of the assembled grid structure 36. While the majority of wall members 108 are of a single thickness of metal, wall members 110 are formed of two thicknesses of metal in this embodiment.

Therefore, the invention provides a grid structure with versatility in packing density equipped with a novel hydraulic rod constraining, spring and readily assemblable into a ductless core component.

While preferred embodiments of the invention have been disclosed herein, many modifications thereof are possible. This invention should not be restricted except insofar as is necessitate by the spirit of the prior art

We claim:

1. A ductless core component for use in a liquid cooled, fast flux nuclear reactor core for axially and laterally constraining a plurality of elongated rods containing nuclear material comprising:
   an upper support plate member,
   an upper spacer grid member,
   a plurality of intermediate spacer grid members,
   a lower spacer grid member,
   a lower support plate member,
   a nozzle means,
   a flow dispersion tube means for fluidly and mechanically connecting said nozzle means to said lower support plate member,
   a handling socket means attached to said upper support plate member for enabling gripping of the core component,
   a plurality of orifice plates disposed between said lower support plate member and said nozzle means,
   a plurality of support rods passing through said lower spacer grid member, said intermediate spacer grid members, and said upper spacer grid member fixedly attached to said lower support plate member and to said upper support plate member, said support rods being provided with passage means axially therethrough for passing a flow of coolant, and
   a plurality of spacer sleeve means disposed about each of said support rods between said upper spacer grid member and the uppermost of said intermediate spacer grid members, between each of said intermediate spacer grid members and said intermediate spacer grid member immediately beneath it, and between the lowermost of said intermediate spacer grid members and said lower space grid member for maintaining a predetermined spacing between said grid members between which said spacer sleeve means are disposed, each of said spacer sleeves being bowed with respect to their axis to grip said support rods to prevent flow induced vibration damage to said support rods,
   each of said upper spacer grid member, said plurality of intermediate spacer grid members, and said lower spacer grid member comprising a plurality a cell members, the cell members being substantially triangular and being formed through the interconnection of a plurality of top grid strip members, a plurality of middle grid strip members, a plurality of bottom grid strip members, and outer grid strip members, each elongated rod passing through and being laterally constrained within one of the cell members, each cell member comprising three wall members, each wall member comprising a portion of a top grid strip member, a middle grid strip member, a bottom grid strip member, or an outer grid strip member.

2. The ductless core component according to claim 1 wherein each wall member of each cell member formed by interconnecting the top grid strip members, the middle grid strip members, the bottom grid strip members, and the outer grid strip members consists of a portion of a top grid strip member, a middle grid strip member, a bottom grid strip member, or an outer grid strip member.

3. The ductless core component according to claim 1, futher comprising hardstop members provided intermediate two of the wall members of each substantially triangular cell members and spring means provided intermediate a third wall member of each cell member for biasing an elongated rod passing through the cell member against the hardstop members.

4. The ductless core component according to claim 3, wherein said spring means is disposed at an angle with respect to the flow of coolant through the ductless core component, which flow is substantially along the axis of the elongated rods, which axis corresponds to the axis of the ductless core component, and is resilient, whereby the flow of coolant upwardly through the cell member causes a biasing force in said spring means, the biasing force forcing the rod against said hardstop members, the strength of the biasing force being dependent on the rate of flow of coolant through the nuclear reactor core component.

5. The ductless core component according to claim 1 wherein the top grid strip members are provided with first slot means along the bottom edges thereof for receiving middle grid strip members, the middle grid strip members are provided with the second slot means along the top edges thereof for engaging said second slot means of the top grid strip members when the top grid strip members and the middle grid strip members are interconnected, the middle grid strip members being further provided with the third slot means along the bottom edges thereof for receiving bottom grid strip members, and the bottom grid strip members are provided with third slot means along the top edges thereof for engaging the third slot means when the middle grid strip members and the bottom grid strip members are interconnected.

6. The ductless core component according to claim 5 wherein the outer grid strip member of each of said top, intermediate and lower spacer grid members is adapted to engage the lateral edges of the top grid strip members, the middle grid strip members and the bottom grid strip members interconnected to form each top, intermediate, and bottom grid member.

* * * * *